Feb. 21, 1961 S. STANDAL 2,972,364
SAW TEETH
Filed Jan. 28, 1958 4 Sheets-Sheet 1
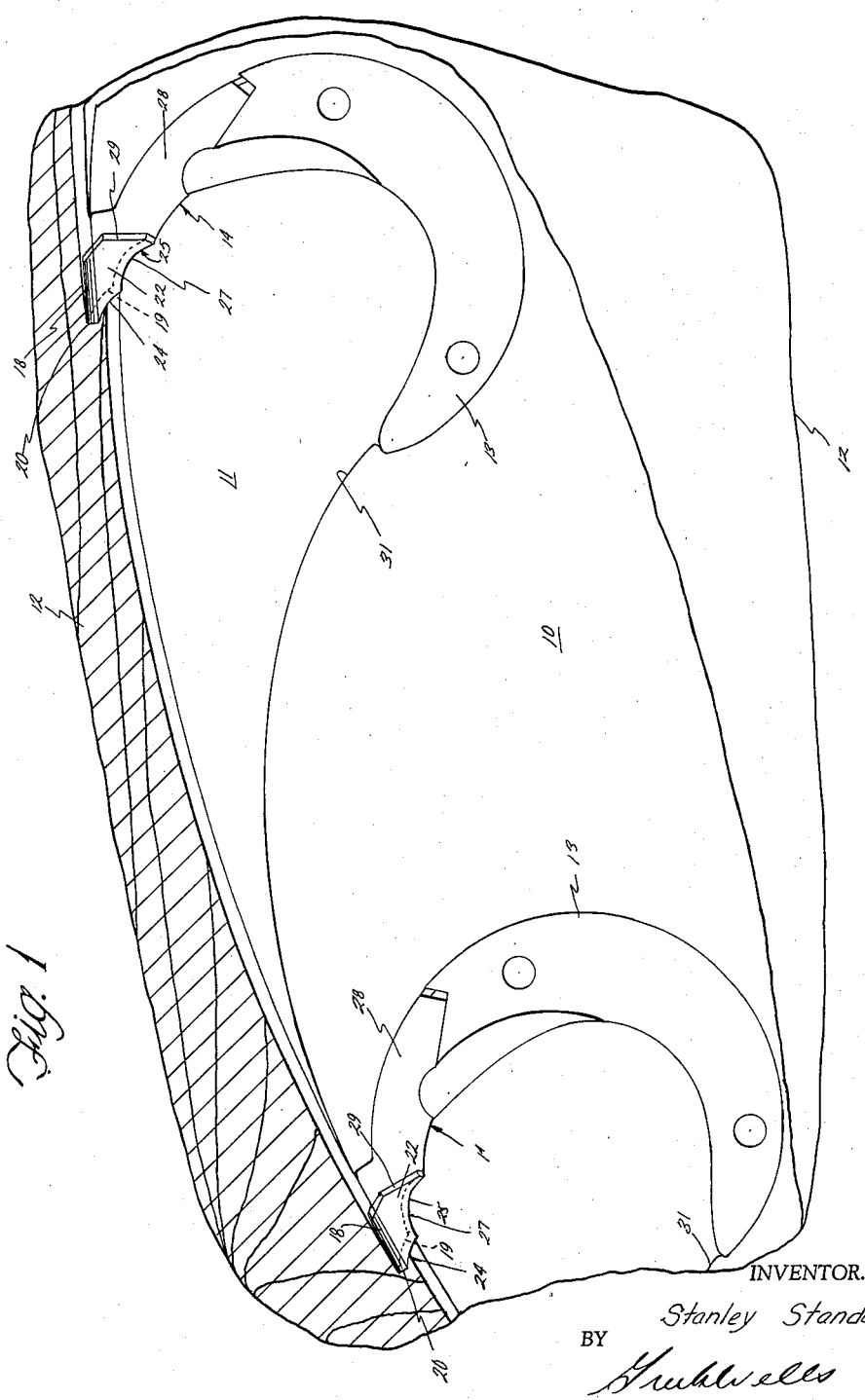
INVENTOR.
Stanley Standal
BY
Atty

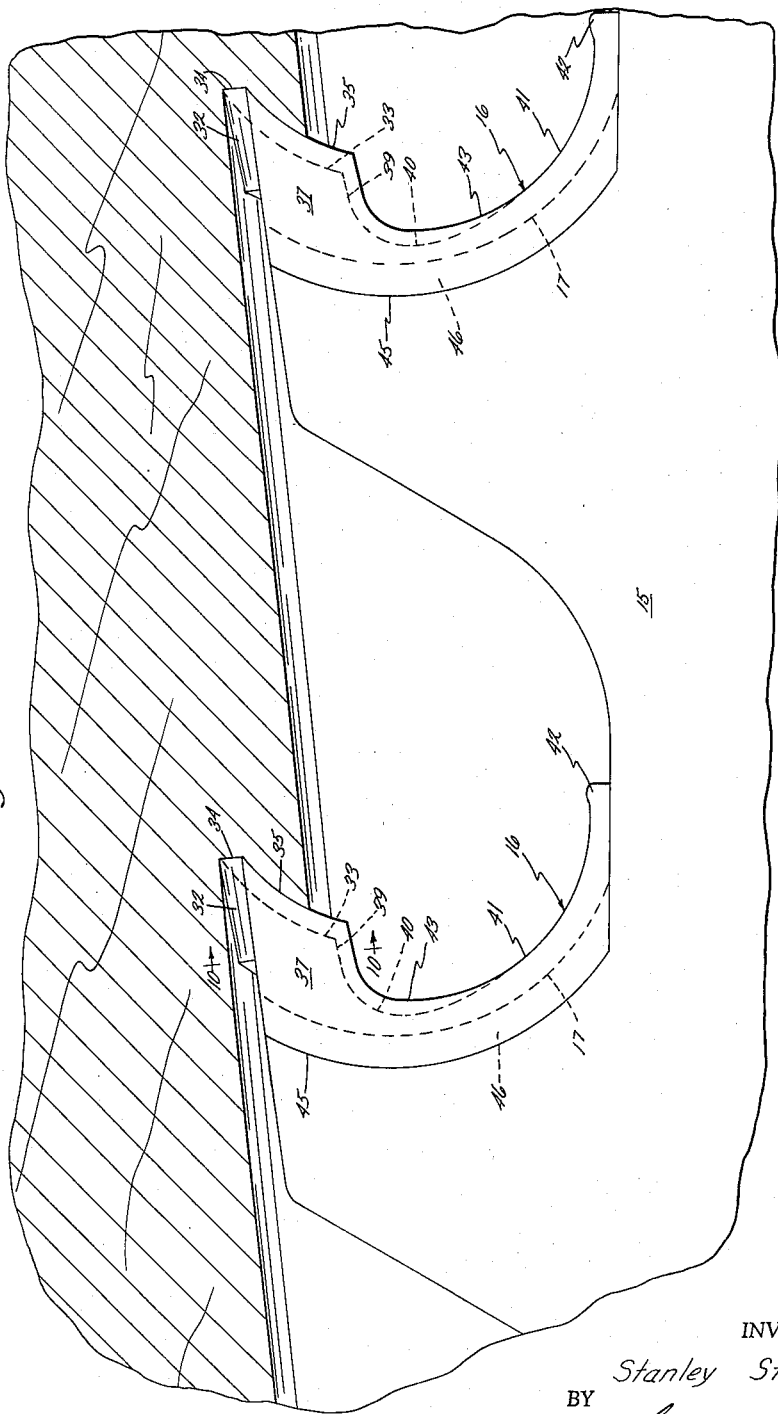

Feb. 21, 1961 S. STANDAL 2,972,364
SAW TEETH
Filed Jan. 28, 1958 4 Sheets-Sheet 3
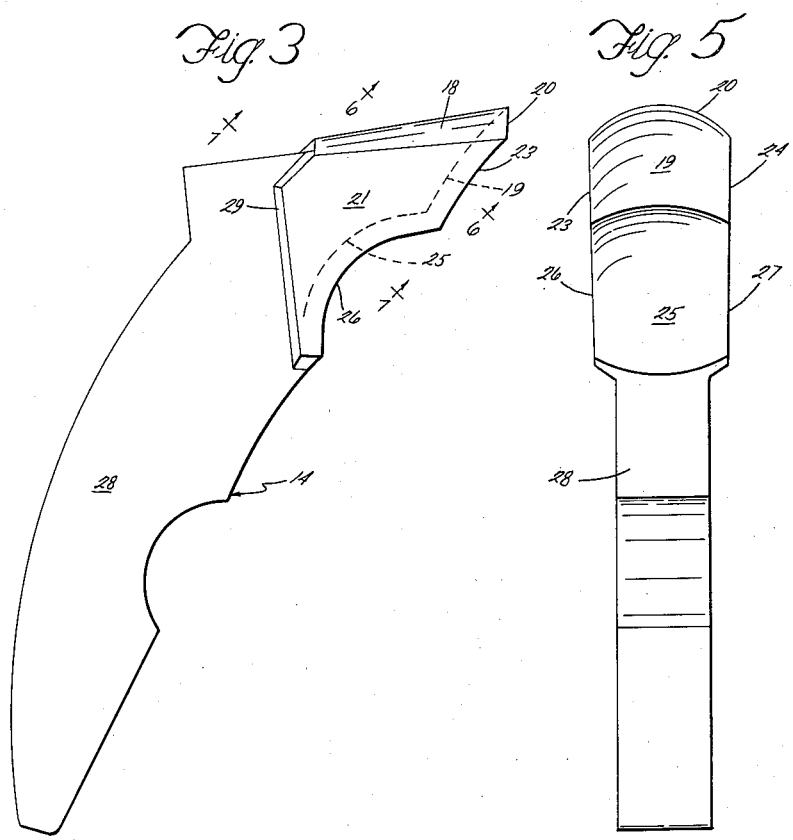
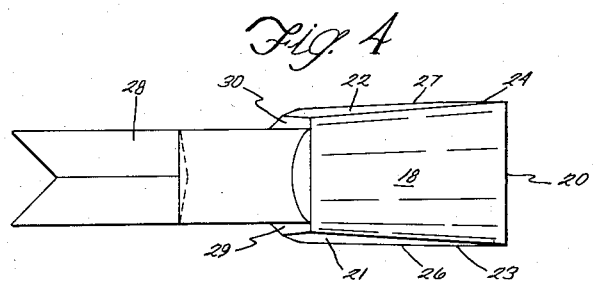
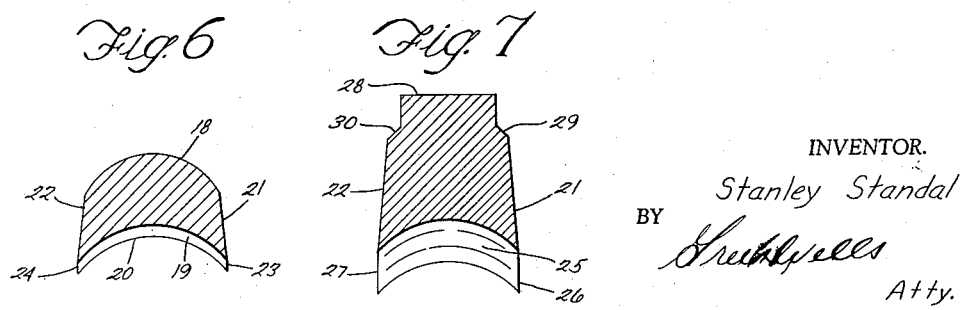
INVENTOR.
Stanley Standal
BY
Atty.

Feb. 21, 1961 S. STANDAL 2,972,364
SAW TEETH
Filed Jan. 28, 1958 4 Sheets-Sheet 4

INVENTOR.
Stanley Standal
BY
Atty.

United States Patent Office 2,972,364
Patented Feb. 21, 1961

2,972,364
SAW TEETH

Stanley Standal, E. 1302 15th, Spokane, Wash.; Elizabeth V. Standal, executrix of said Stanley Standal, deceased Filed Jan. 28, 1958, Ser. No. 711,720

5 Claims. (Cl. 143—141)

My invention relates to a sawtooth for use in sawing logs into lumber. The saws commonly used today in sawing lumber make sawdust of the wood removed. This sawdust is too fine and the fibers are too short in length to have much value as pulp material for making paper and the like. The action of the teeth of these saws is a tearing action which breaks out the wood removed and leaves a rough splintery surface on the boards.

It is the purpose of my invention to provide a sawtooth applicable to circular saws, band saws, etc. with cutting edges that slice the wood to remove it from between boards and with surfaces that compress the sliced out wood to keep it in chips wherein the wood fibers are long enough to make good pulp for paper making and other uses.

I have found that I can successfully convert the material removed from the log into chips of fibers suitable for pulp making and at the same time produce a smoother surface on the boards than the conventional sawing. This results in substantial savings of the available wood in a log. Most of the wood formerly converted to sawdust that was usable only for fuel, wood flour or filler can be used in pulp making. Smoother kerf walls reduces the amount of material that must be removed by planers to obtain an acceptably smooth surface on the lumber.

More specifically it is the purpose of my invention to provide a sawtooth having a convex hood or top surface, and a concave face and throat with a continuous cutting edge of U-shape where the legs of the U are the intersections of the tooth cheeks with the concave face and the base of the U is the intersection of the front edges of the convex hood and the concave face.

The concave throat intersects the cheeks to form cutting edges that shave the kerf surfaces. The inclination of the face and cutting edges with respect to direction of travel of the tooth causes the removed wood to move across the throat into the sawdust pockets of the saw in chip lengths of upwards of an inch with only a small portion of the order of 15% of the removed wood being splinters and fines.

The nature and advantages of my invention will appear more fully from the following description and the accompany drawings illustrating a preferred form of the invention. The description and drawings are intended to be illustrative only and are not intended to limit the invention except insofar as it is limited by the claims.

In the drawings:

Figure 1 is a sectional view through a portion of a log showing in side elevation a portion of a circular saw equipped with saw teeth embodying my invention;

Figure 2 is a sectional view similar to Figure 1, but showing the sawteeth embodying my invention applied to a band saw;

Figure 3 is an enlarged side view of a saw tooth embodying my invention;

Figure 4 is a top view looking down on the sawtooth;

Figure 5 is a face view looking at Figure 3 from the right;

Figure 6 is a sectional view taken on the line 6—6 of Figure 3;

Figure 7 is a sectional view taken on the line 7—7 of Figure 3;

Figure 8:
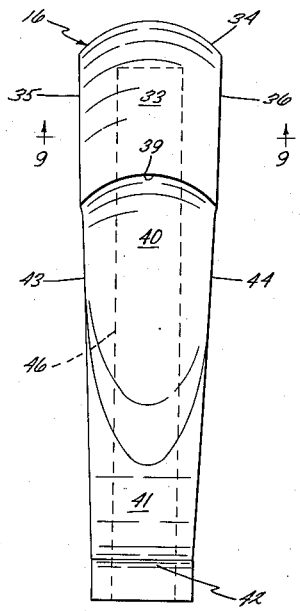
Figure 8 is an enlarged front face view of one of the teeth shown in Figure 2.
Figure 9:
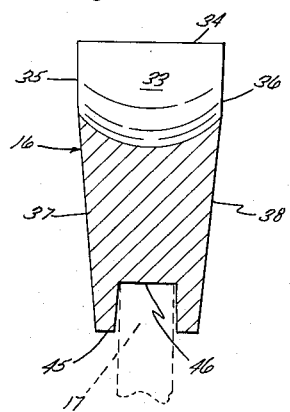
Figure 9 is a sectional view on the line 9—9 of Figure 8.
Figure 10:
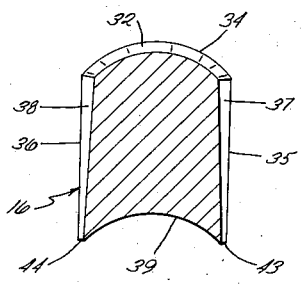
Figure 10 is a sectional view taken on the line 10—10 of Figure 2.

Referring now to the drawings, Figure 1 illustrates a portion 10 of a circular saw as it appears in the kerf 11 of a log 12, that is being sawed. Locking shanks 13 are used to lock the teeth 14 to the saw in the customary manner.

In Figure 2 of the drawings the invention is shown applied to a band saw 15, the teeth 16 being secured to the saw 15 by soldering in the channels 17 formed at the back edges of the teeth 16 or by any suitable method.

My invention is not limited as to the type of saw used or the manner of attaching the teeth to the saw. It is applicable to all types of wood saws commonly used in sawmills. My invention concerns itself with the structure of the tooth itself whereby the slice of material taken out in dividing a log or cant lengthwise, is removed by slicing out the material and compressing it from the sides as it is removed, leaving the removed material with the wood fibers together in relatively long unbroken condition. In order to obtain the wood fibers in substantial lengths without breaking them, it is essential that the cut of each tooth of the saw be sufficient to provide the desired length of fiber. In splitting a log or cant the saw teeth move across the piece. Each tooth advances into the piece a distance beyond the path of the previous tooth that determines the length of the wood fibers removed because these fibers run lengthwise of the piece except in the knots. A saw tooth constructed in accordance with my invention provides the necessary cutting edges so arranged as to cut off the fibers and remove them in chips with very little shattering or breaking of the fibers.

Referring now to Figures 3 to 7 inclusive, which show the detailed tooth construction, the top or land of the tooth 14 is indicated at 18. It will be noted that the land surface 18 of the tooth is convex and that it is reduced gradually in height and in thickness crosswise of the tooth from front to back. It is, as shown, a segment of a frustum of a cone. The face 19 of the tooth is concave and slopes away from the front cutting edge 20 rearwardly and inwardly. Immediately behind the face 19 of the tooth 14, a throat 25 is provided. This throat 25 is also concave and its intersection with the cheeks 21 and 22 of the tooth provides cutting edges 26 and 27. The tooth 14 has a mounting portion 28 which is thinner than the active portion of the tooth. Shoulders 29 and 30 are formed between the rear edges of the cheeks 21 and 22 and the mounting portion 28 of the tooth 14.

A saw tooth must be provided with adequate clearance so that after the wood is removed the kerf does not bind on the tooth. In the present tooth the feed clearance is obtained by forming the surface of the land 18 so that the top of the land surface recedes from the leading edge at an angle to the direction of travel of the leading edge sufficient to compensate for feed. For example, this angle should be such that a line extended from the top of the land surface rearwardly will strike the throat of the next tooth. The cheeks 21 and 22 are plane or nearly plane surfaces, the front edges of which converge from the edge 20 of the tooth downwardly along the edges 23 and 24 at preferably about 1 degree with a tolerance of ½ degree. This provides what I term cheek or down clearance. The back clearance is measured by the convergence of two lines drawn across the cheeks perpendicular to their front edges 23 and 24. It should be between 8 degrees and 9 degrees.

When the clearances are provided in the manner just described, the cheek and land surfaces of the teeth are freed from binding in the kerf of the piece being sawed with a minimum of unevenness in the kerf surfaces. It is important to have the kerf surfaces smooth as that reduces the amount of finishing that has to be done later to provide acceptable board surfaces. It is evident that, by increasing the down clearance, there will be greater variation between the width of cut at the front cutting edge 20 and the width of cut at the rear ends of the cutting edges 23 and 24. This will make greater unevenness in the kerf surface. Ideally edges 23 and 24 should be parallel.

The construction of the tooth is such that as it wears from use and sharpening the proper relation between cheek clearance and back clearance is maintained even though the width of cut diminishes. The concavity of the face 19 preferably is circular in a plane transversely of the tooth 14 perpendicular to the face 19 and the radius of curvature of the face 19 preferably is sufficiently longer than the radius of the curvature of the land surface 18 that the front cutting edge 20 is substantially in a plane at right angles to the direction of travel of the tooth. The mid portion of the edge 20 can be somewhat forward of its ends but should not be any appreciable amount behind the ends, otherwise the corners at the junctions of the edge 20 with the edges 23 and 24 will be too weak. The hood or land surface should be curved on a radius of about ¼ inch at its front end for 11/32 inch width for the front cutting edge to provide adequate strength in the tooth and position the front edge 20 correctly if the front face 19 has a radius of curvature of about ⅜ inch in a plane perpendicular to the face 19. The front face 19 makes an average angle or "hook" of about 45 degrees to the direction of travel of the tooth. I prefer to curve this face as shown, so that the front face 19 and the edges 23 and 24 have a curved profile which is on about a ⅞ inch radius. The meeting angle of the surfaces 18 and 19 at 20 is therefore somewhat less than 45 degrees. When the tooth is formed as described above, the front cutting edge 20 and the cutting edges 23 and 24 meet smoothly and cut the wood to be removed so that it follows the face 19 without breaking the fibers excessively. The depth of the tooth along the cheeks 21 and 22 from the rear ends of the edges 23 and 24 to the intersection of the cheeks 21 and 22 with the land surface 18 may be varied greatly, but I find a depth of about ¼ inch to ⅝ inch gives fibers of adequate length.

If the feed is such that each tooth advances more than the depth just mentioned, then of course, there must be some breaking of the wood at the kerf. The throat 25 is provided with the edges 26 and 27 to smooth the kerf and remove any projections where such breaking occurs due to feeding the piece too fast. It will be noted that the throat 25 is concave transversely of the tooth. This concavity is preferably the same as that of the face 19. The front part of the throat 25 runs practically straight back a distance of about 3/16 inch rearwardly from the face 19 along a line which diverges rearwardly at about 10 degrees with respect to the land 18. This portion of the throat merges into a curve away from the hood of the tooth which completes the inner or back portion of the throat. The curvature of this part of the throat 25 is on a radius of about ¼ inch.

The face 19 and throat 25 of the tooth cooperate to direct the removed chip into the gullet 31 of the saw. As the tooth is sharpened the front straight portion of the throat is cut away. Chips cut by the face break into short lengths of the order of an inch and are pushed out into the gullet by the rear portion of the throat as they break off so that they do not directly impinge upon the front face of the locking shank until they are free in the gullet.

Referring now to Figures 2 and 8 in particular, these figures show how the saw tooth 16 is applied to a straight saw 15 such as a band saw. The convex land 32 and the concave face 33 are of essentially the same shape in this tooth as the land 18 and the face 19 of the tooth 14. The tooth 16 has a shorter land surface 32 than the land surface 18 of the tooth 14 although this length may be varied. The face 33 is concave with cutting edges 35 and 36 which converge rearwardly from the front cutting edge 34 about 1 degree plus or minus ½ degree to establish proper down clearance. The back clearance of the cheeks 37 and 38 of the tooth 16 is obtained by converging the cheeks 37 and 38 rearwardly about 8 degrees to 9 degrees. The throat portion 39 of the tooth is extended straight back from the rear end of the face 33 in a direction parallel to the top of the land 32, then the throat has a portion 40 that curves away from the land 32 on a radius of about ¼ inch until the throat face is perpendicular to the direction of travel of the saw. At this point the apron 41 of the tooth 16 joins the throat portion 40 and curves forwardly on an increased radius of about ¾ inch to a raised toe portion 42. The throat portions 39 and 40 and the apron 41 are provided with side cutting edges 43 and 44 and are hollowed out between the side edges in the same manner as the throat 25 in the tooth 14 is hollowed out.

The back 45 of the tooth 16 is provided with a channel 46 that is fitted over the advancing edge 17 of the saw 15. To secure the tooth in place any suitable means may be employed. One method of mounting the teeth 16 is to provide the channels 46 with a coating of solder, then clamping and heating them on the saw. They remain in place until they are worn out or damaged too much for further use. They can then be removed by local heating of the soldered joint until the solder softens. The raised toe 42 is provided to give a lift to the chips as they are forced around the apron forwardly into the gullet of the saw.

In operation of saws equipped with teeth constructed in accordance with my invention, the cutting edges along the front of the cheeks remain sharp, apparently due to a certain amount of self sharpening effect. The cheek surfaces show wear on the front from the point of the tooth all the way down to the lower edge of the throat which indicates that the cheek clearance is adequate and that the face and throat cutting edges are both used, the face edges to cut the chip and the throat edges to clear the kerf surfaces.

According to my invention the convex land 18 or 32 which I call the hood of the tooth ties the corners at the front of the tooth together and provides adequate center strength to support the cutting load. Concaving the front face transversely gives cutting edges to the cheeks and a smooth guide surface for taking the chip away as it is cut. Curving the hood surface transversely and curving the front face transversely provides the proper shape of the front cutting edge and proper strength where this edge meets the side cutting edges. The profile curvature of the front face coupled with the transverse concavity of the front face compresses the chip, eliminating "bushing" and feathering. The throat provides adequate room for sharpening the tooth and for clearance of the chips when they break in leaving the face of the tooth. The sharp edges of the throat clear the kerf walls of any "break out" and aid in keeping the kerf smooth. The need for the throat edges is particularly great where a tooth is forced, due to improper feed, to take too great a cut for the cutting edges on the face. A break out of a part of the wood then occurs and the cutting edges on the throat shear the surfaces where the break out occurs.

In sawing logs with saws equipped with teeth constructed as described hereinbefore, the removed wood has been recovered as chips having a thickness in the direction in which the fibers run of ¼ inch to ⅝ inch. The chips break up into length of about ½ inch to 1½ inches by the time they leave the saw. These chips are quite satisfactory chips for making paper pulp. It appears that the action of the concave face and concave throat in compressing the removed wood as it moves away from the front cutting edge is quite effective in preventing separation and breaking of the wood fibers.

The nature and advantages of my invention are believed to be clear from the foregoing description.

Having described my invention, I claim:

1. A saw tooth having cheek surfaces at its sides, a top land surface which is straight from front to back and is convexly curved in a rearwardly converging conical section formed transversely of the tooth, and a front face surface which is concavely curved transversely of the tooth on a radius substantially greater than the front radius of the curvature of the land surface at the base of the conical section and meets the land surface in a plane at substantially right angles to the direction of travel of the tooth, said front face surface diverging from the land surface from the line of meeting with the land surface rearwardly and meeting the cheek surfaces at acute angles thereby providing a front cutting edge extending across the tooth and side cutting edges meeting the front cutting edge at an angle and diverging from the land surface rearwardly, the said cheek surfaces comprising substantially planar surfaces converging in a direction perpendicular to said side cutting edges and said side cutting edges being substantially parallel to one another.

2. A saw tooth having cheek surfaces at its sides, a top land surface which is convexly curved in a rearwardly converging conical section formed transversely of the tooth, the base radius of curvature of the conical section being less than the thickness of the tooth, and a front face surface which is concavely curved transversely of the tooth on a radius sufficiently greater than the front radius of curvature of the land surface at the base of the conical section to maintain the meeting edge of the land surface and front face surface in front of a plane perpendicular to the land surface through the ends of said meeting edge, the front face surface meeting the cheek surfaces and the land surface at acute angles, the meeting edges of the cheek surfaces with said front face surface being substantially parallel to each other and diverging from the land surface rearwardly, the cheek surfaces being planes converging in a direction substantially perpendicular to their meeting edges with the front face surface.

3. A saw tooth having cheek surfaces at its sides, a top land surface which is convexly curved in a rearwardly converging conical section formed transversely of the tooth, the base radius of curvature of the conical section being less than the thickness of the tooth, and a front face surface which is concavely curved transversely of the tooth on a radius sufficiently greater than the front radius of curvature of the land surface at the base of the conical section to maintain the meeting edge of the land surface and front face surface in front of a plane perpendicular to the land surface through the ends of said meeting edge, the front face surface meeting the cheek surfaces and the land surface at acute angles, the meeting edges of the cheek surfaces with said front face surface being substantially parallel to each other and diverging from the land surface rearwardly, the cheek surfaces being planes converging in a direction substantially perpendicular to the meeting edges with the front face surface, said tooth having a throat provided with a transversely concave surface which intersects the front face surface of the tooth, the throat surface curving away from the land surface rearwardly of its intersection with the front face surface, and the side edges of said throat surface converging rearwardly.

4. A saw tooth having cheek surfaces at its sides, a top land surface which is convexly curved in a rearwardly converging conical section formed transversely of the tooth, and a front face surface which is concavely curved transversely of the tooth on a radius sufficiently greater than the front radius of curvature of the land surface at the base of the conical section to maintain the meeting edge of land surface and front face surface in front of a plane perpendicular to the land surface through the ends of said meeting edge, the front face surface meeting the cheek surfaces and the land surface at acute angles, the meeting edges of the cheek surfaces with said front face surface being substantially parallel to each other and diverging from the land surface rearwardly, the cheek surfaces being planes converging in a direction substantially perpendicular to their meeting edges with the front face surface.

5. A saw tooth having cheek surfaces at its sides, a top land surface which is straight from front to back and is convexly curved in a rearwardly converging conical section formed transversely of the tooth, and a front face surface which is concavely curved transversely of the tooth on a radius substantially greater than the front radius of the curvature of the land surface at the base of the conical section, said front face surface diverging from the land surface from the line of meeting with the land surface rearwardly and meeting the cheek surfaces at acute angles thereby providing a front cutting edge extending across the tooth and side cutting edges meeting the front cutting edge at an angle and diverging from the land surface rearwardly, the said cheek surfaces comprising substantially planar surfaces converging in a direction perpendicular to said side cutting edges and said side cutting edges being substantially parallel, said tooth having a throat provided with a transversely concave surface which intersects the front face surface of the tooth, the throat surface curving away from the land surface rearwardly of its intersection with the front face surface, and the side edges of said throat surface converging rearwardly.

References Cited in the file of this patent

UNITED STATES PATENTS

| | | |
|---|---|---|
| 192,090 | Spaulding | June 19, 1877 |
| 1,698,909 | Currier | Jan. 15, 1929 |
| 1,936,242 | Orr | Nov. 21, 1933 |
| 2,360,336 | Gibbs | Oct. 17, 1944 |